US009545911B2

(12) United States Patent
Kim

(10) Patent No.: US 9,545,911 B2
(45) Date of Patent: Jan. 17, 2017

(54) COLLISION AVOIDANCE APPARATUS AND METHOD FOR VEHICLE

(71) Applicant: MANDO CORPORATION, Pyeongtaek-si (KR)

(72) Inventor: Deok-Ju Kim, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 14/260,156

(22) Filed: Apr. 23, 2014

(65) Prior Publication Data

US 2014/0324297 A1    Oct. 30, 2014

(30) Foreign Application Priority Data

Apr. 24, 2013   (KR) .................. 10-2013-0045352

(51) Int. Cl.
*B60W 10/20*    (2006.01)
*B60W 10/184*    (2012.01)
(Continued)

(52) U.S. Cl.
CPC ............ *B60W 10/20* (2013.01); *B60W 10/184* (2013.01); *B60W 30/09* (2013.01); *B60W 30/045* (2013.01);
(Continued)

(58) Field of Classification Search
CPC ...... B60W 30/09; B60W 10/20; B60W 10/184
See application file for complete search history.

(56) References Cited

U.S. PATENT DOCUMENTS

2008/0262689 A1* 10/2008 Sayers .................... B60T 8/246
701/70
2008/0281521 A1   11/2008 Shirato
(Continued)

FOREIGN PATENT DOCUMENTS

CN        102815298       12/2012
DE        19926745        12/1999
(Continued)

OTHER PUBLICATIONS

Office Action dated Nov. 6, 2014 for German Patent Application No. 102014005924.3 and its English summary provided by Applicant's foreign counsel.
(Continued)

*Primary Examiner* — Basil T Jos
(74) *Attorney, Agent, or Firm* — Ladas & Parry, LLP

(57) ABSTRACT

Provided are collision avoidance apparatus and method for a vehicle, which are capable of maintaining a braking force and assisting a steering force by providing a braking control signal and a steering control signal to a wheel of a driver's steering intention direction during braking for collision avoidance, thereby achieving lateral avoidance. The collision avoidance apparatus for the vehicle includes: a measurement unit configured to measure a motion of an opposite vehicle; and an electronic control unit configured to determine whether there is a risk of collision with the opposite vehicle, based on a measurement result from the measurement unit, and, when it is determined that there is the risk of collision, provide a braking control signal and a steering control signal to an actuator for controlling a wheel of a driver's steering intention direction and provide a braking release signal for releasing a braking force from a wheel opposite to the driver's steering intention direction.

12 Claims, 3 Drawing Sheets

(51) Int. Cl.
*B60W 30/09* (2012.01)
*B60W 30/045* (2012.01)
*G08G 1/16* (2006.01)

(52) U.S. Cl.
CPC ...... *B60W 2520/10* (2013.01); *B60W 2520/14* (2013.01); *B60W 2540/18* (2013.01); *B60W 2550/10* (2013.01); *B60W 2550/306* (2013.01); *B60W 2550/308* (2013.01); *G08G 1/166* (2013.01)

(56) References Cited

U.S. PATENT DOCUMENTS

| | | | | |
|---|---|---|---|---|
| 2013/0338877 | A1* | 12/2013 | Straus | B60W 30/09 701/41 |
| 2014/0142811 | A1* | 5/2014 | Schaab et al. | 701/41 |
| 2015/0066241 | A1* | 3/2015 | Akiyama | 701/1 |

FOREIGN PATENT DOCUMENTS

| | | |
|---|---|---|
| DE | 10102772 | 7/2002 |
| DE | 102005003274 | 7/2006 |
| DE | 102009020649 | 11/2010 |
| KR | 1996-0000634 | 1/1996 |

OTHER PUBLICATIONS

Office Action dated Feb. 2, 2016 for Chinese Patent Application No. 201410165885.0.

\* cited by examiner

COLLISION AVOIDANCE APPARATUS AND METHOD FOR VEHICLE

CROSS-REFERENCE(S) TO RELATED APPLICATION

This application claims the benefit of Korean Patent Application No. 10-2013-0045352, filed on Apr. 24, 2013, in the Korean Intellectual Property Office, the contents of which are incorporated herein by reference in its entirety.

BACKGROUND OF THE INVENTION

Field of the Invention

The present invention relates to a collision avoidance apparatus and method for a vehicle, and more particularly, to a collision avoidance apparatus and method for a vehicle, which are capable of maintaining a braking force and assisting a steering force by providing a braking control signal and a steering control signal to a wheel of a driver's steering intention direction during braking for collision avoidance, thereby achieving lateral avoidance.

Description of the Related Art

Generally, a vehicle is equipped with a collision avoidance system so as to avoid collision with an obstacle (for examples, other vehicle) located in front of the vehicle or behind the vehicle. Such a collision avoidance system assists a driver to drive safely by avoiding collision with obstacles located in front of the vehicle or behind the vehicle.

Conventional collision avoidance systems are disclosed in Korean Patent Publication No. 1996-0000634, and so on. A distance between a self vehicle and an obstacle is measured using a distance sensor (for example, a radar or an ultrasonic sensor) or an image sensor (for example, a camera), and a driver is informed of a collision risk by a warning sound generated when a vehicle approaches an opposite vehicle within a predetermined distance, depending on the measured distance and the velocity of the opposite vehicle.

Such conventional collision avoidance systems prevent collision by simply measuring the relative velocity and the distance. However, since a braking distance is changed according to a vehicle condition and a driving road condition, a vehicle cannot avoid an obstacle (for example, an opposite vehicle) predicted to collide with. Hence, a probability of collision with the opposite vehicle is increased.

In particular, when an abrupt longitudinal collision risk during driving is predicted, a driver tries to avoid collision by braking. When an input value of a brake pedal pressurized by a driver is large, a braking force greater than a target braking force is applied to operate an antilock brake system (ABS). At this time, a longitudinal collision risk caused by deceleration is reduced, but a steering force is lost and thus a lateral avoidance may be impossible.

CITATION LIST

Patent Literature

Patent Literature 1: Korean Patent Publication No. 1996-0000634, published on Jan. 25, 1996, entitled "COLLISION AVOIDING DEVICE" (Hyundai Electronics Industries Co. Ltd. and 1 other).

SUMMARY OF THE INVENTION

An aspect of the present invention is directed to provide a collision avoidance apparatus and method for a vehicle, which are capable of maintaining a braking force and assisting a steering force by providing a braking control signal and a steering control signal to a wheel of a driver's steering intention direction during braking for collision avoidance, thereby achieving lateral avoidance.

According to an embodiment of the present invention, a collision avoidance apparatus for a vehicle includes: a measurement unit configured to measure a motion of an opposite vehicle; and an electronic control unit configured to determine whether there is a risk of collision with the opposite vehicle, based on a measurement result from the measurement unit, and, when it is determined that there is the risk of collision, provide a braking control signal and a steering control signal to an actuator for controlling a wheel of a driver's steering intention direction and provide a braking release signal for releasing a braking force from a wheel opposite to the driver's steering intention direction.

The collision avoidance apparatus may further include a steering angle sensor configured to detect the driver's steering intention direction.

The electronic control unit may include: a calculation unit configured to calculate a collision risk degree, including a collision prediction time and a collision prediction area overlapped with the opposite vehicle, based on vehicle velocity and trajectory of the corresponding vehicle which are predicted through a vehicle velocity sensor, a yaw rate sensor, and the steering angle sensor installed in the vehicle, and position and velocity of the opposite vehicle which are obtaining by measuring a motion of the opposite vehicle through the measurement unit; a determination unit configured to determine whether the collision prediction time calculated by the calculation unit is less than a preset reference time; and an avoidance control unit configured to, when it is determined by the determination unit that the collision prediction time is less than the preset reference time, generate a braking signal for maintaining a braking force at the wheel of the driver's steering intention direction, based on a detection signal detected by the steering angle sensor, and generate a steering control signal for providing a steering force according to the driver's steering intention.

The determination unit may further determine whether the collision prediction area calculated by the calculation unit is larger than a reference area, and the avoidance control unit may generate a preset braking signal when it is determined by the determination unit that the collision prediction area is smaller than the reference area and the calculated collision prediction time exceeds the reference time, and may generate a braking signal corresponding to twice the preset braking signal when the collision prediction area is larger than the reference area and the calculated collision prediction time is less than the reference time.

According to another embodiment of the present invention, a collision avoidance method of a collision avoidance apparatus for a vehicle includes: receiving measurement results from a sensor and a measurement unit installed in the vehicle; determining whether there is a risk of collision with an opposite vehicle, based on the received measurement results; and when it is determined that there is the risk of collision, providing a braking control signal and a steering control signal to an actuator for controlling a wheel of a driver's steering intention direction, and providing a braking release signal for releasing a braking force from a wheel opposite to the driver's steering intention direction.

The collision avoidance method may further include: receiving a detection signal corresponding to the driver's steering intention direction detected by a steering angle sensor installed in the vehicle.

The collision avoidance method may further include: after the receiving step, calculating a collision risk degree, including a collision prediction time and a collision prediction area overlapped with the opposite vehicle, based on vehicle velocity and trajectory of the vehicle which are predicted through a vehicle velocity sensor, a yaw rate sensor, and the steering angle sensor installed in the vehicle, and position and velocity of the opposite vehicle which are obtained by measuring a motion of the opposite vehicle through the measurement unit. The determining step may determine whether the collision prediction time calculated through the calculating step is less than a preset reference time, and when it is determined that the collision prediction time is less than a preset reference time. The providing step may generate a braking signal for maintaining a braking force at a wheel of the driver's steering intention direction, based on the detection signal detected by the steering angle sensor, and generate a steering control signal for providing a steering force according to the driver's steering intention The determining step may further determine whether the calculated collision prediction area is larger than a reference area, and the providing step may generate a preset braking signal when it is determined that the collision prediction area is smaller than the reference area and the calculated collision prediction time exceeds the reference time, and may generate a braking signal corresponding to twice the preset braking signal when the collision prediction area is larger than the reference area and the calculated collision prediction time is less than the reference time.

DETAILED DESCRIPTION OF EXEMPLARY EMBODIMENTS

Exemplary embodiments of the present invention will be described below in detail with reference to the accompanying drawings.

Figure 1:
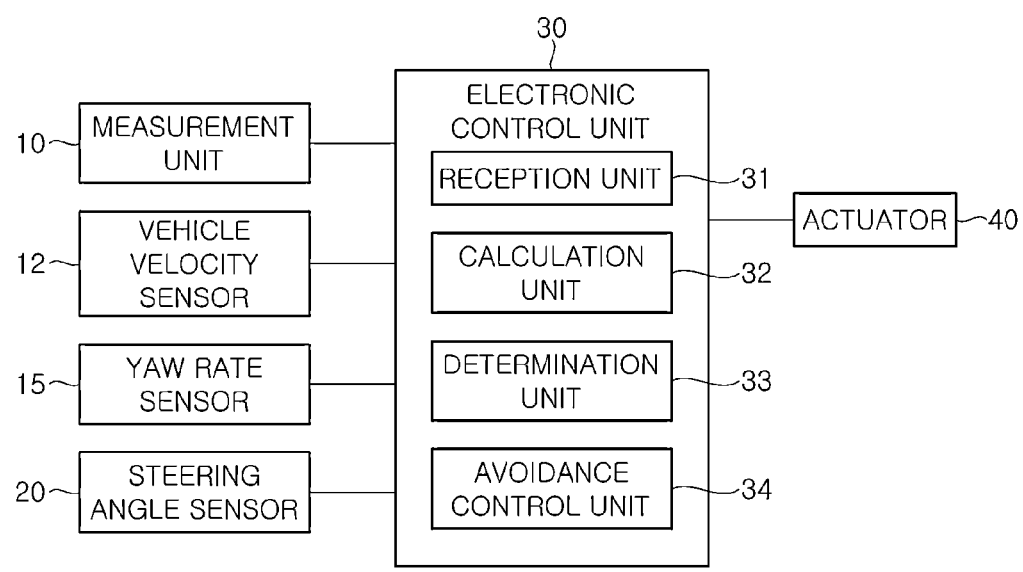
FIG. 1 is a block diagram illustrating a collision avoidance apparatus for a vehicle according to an embodiment of the present invention.

FIG. 1 is a block diagram illustrating a collision avoidance apparatus for a vehicle according to an embodiment of the present invention.

Referring to FIG. 1, the collision avoidance apparatus for the vehicle according to the embodiment of the present invention includes a measurement unit 10, a vehicle velocity sensor 12, a yaw rate sensor 15, a steering angle sensor 20, an electronic control unit 30, and an actuator 40.

The measurement unit 10 is configured to measure a motion of an obstacle (for example, an opposite vehicle) located in front of the vehicle or behind the vehicle. Radar may be used as the measurement unit 10. In addition, cameras may be used as the measurement unit 10.

The measurement unit 10 detects a light reception signal returned back from a proceeding opposite vehicle after emitting a laser beam forward, converts the detected light reception signal into a distance, and transfers the distance to the electronic control unit 30. That is, when an obstacle is detected in front of the vehicle, the measurement unit 10 calculates a distance between the vehicle and the obstacle and a relative velocity of the vehicle with respect to the obstacle, and transfers the calculated distance to the electronic control unit 30.

The vehicle velocity sensor 12 is installed in the vehicle to measure a vehicle velocity. A vehicle velocity measured by the vehicle velocity sensor 12 is transferred to the electronic control unit 30.

The yaw rate sensor 15 is installed in the vehicle to measure a yaw rate of the vehicle. A yaw rate measured by the yaw rate sensor 15 is transferred to the electronic control unit 30.

The steering angle sensor 20 is installed in the vehicle to detect a driver's handle operation.

The electronic control unit 30 determines whether there is a risk of collision with an opposite vehicle by using the measurement results from the measurement unit 10, for example, the distance, the relative velocity, and the vehicle velocity and trajectory measured by the vehicle velocity sensor 12, the yaw rate sensor 15, and the steering angle sensor 20. When it is determined that there is the risk of collision with the opposite vehicle, the electronic control unit 30 provides a braking force and a steering force to an actuator 40 for controlling a wheel of a driver's steering intention direction. The actuator 40 includes a braking actuator and a steering actuator.

More specifically, the electronic control unit 30 includes a reception unit 31, a calculation unit 32, a determination unit 33, and an avoidance control unit 34.

The reception unit 31 may receive the measurement results from the measurement unit 10, for example, the distance to the opposite vehicle, or the distance to the opposite distance and the relative velocity of a self vehicle with respect to the opposite vehicle. In addition, the reception unit 31 may receive a steering angle caused by the driver's handle operation. Moreover, the reception unit 31 may receive the vehicle velocity and the yaw rate detected by the vehicle velocity sensor 12 and the yaw rate sensor 15 installed in the vehicle.

The calculation unit 32 calculates a collision risk degree, based on the vehicle velocity and trajectory predicted using the vehicle velocity, the steering angle, and the yaw rate which are received by the reception unit 31, and the measured distance or the measured distance and relative velocity from the reception unit 31. The collision risk degree includes a collision prediction area overlapped with the opposite vehicle and a collision prediction time to collide with the opposite vehicle.

The calculation unit 32 may calculate a moving distance (d) after t seconds by using a uniformly accelerated straight-line equation, and may calculate a distance, a velocity, and an acceleration through the sensors and the measurement unit installed in the vehicle. Therefore, the calculation unit 32 may calculate a collision prediction time to collide with the opposite vehicle.

When the relative acceleration is nonzero under a condition that the vehicle velocity of the self vehicle is higher than the vehicle velocity of the opposite vehicle, the calculation unit 32 calculates the collision prediction time (TTC) by Equation 1 below. The vehicle velocity of the self vehicle is measured by the vehicle velocity sensor 12, and the vehicle velocity of the opposite vehicle is measured by the measurement unit 10.

$$TTC = \frac{-V_{rel} + \sqrt{V_{rel}^2 - 2a_{rel}d_x}}{a_{rel}} \quad \text{(Equation 1)}$$

where, $V_{rel}$ is a value obtained by subtracting the vehicle velocity of the opposite vehicle from the vehicle velocity of the self vehicle and is a relative velocity of the self vehicle with respect to the opposite vehicle, $a_{rel}$ is a relative acceleration of the self vehicle with respect to the opposite vehicle and is measured by the measurement unit 10, and $d_x$ is a longitudinal distance to the preceding vehicle.

When the relative acceleration is zero under a condition that the vehicle velocity of the self vehicle is higher than the vehicle velocity of the opposite vehicle, the calculation unit 32 calculates the collision prediction time (TTC) by Equation 2 below.

$$TTC = d_x / -V_{rel} \quad \text{(Equation 2)}$$

The collision prediction area is calculated by Equation 3 below.

$$\text{Collision Prediction Area} = \frac{(W_{sv} + W_{POV})}{2} - d_y \quad \text{(Equation 3)}$$

where, $W_{sv}$ is a vehicle body width of the self vehicle, $W_{POV}$ is a vehicle body width of the opposite vehicle, and $d_y$ is a predicted path of the self vehicle.

The vehicle body width of the self vehicle is a vehicle specification stored in a memory (not illustrated), and the vehicle body width of the opposite vehicle is a value measured by the camera or the radar.

The predicted path $d_y$ of the self vehicle is calculated by Equation 4 below.

$$d_y = \sqrt{\left(\frac{1}{C}\right)^2 - d_x^2} + \frac{1}{C} \quad \text{(Equation 4)}$$

where C is a turning radius.

When the vehicle velocity of the self vehicle is high, the turning radius is a value obtained by dividing by the yaw rate measured by the yaw rate sensor by the vehicle velocity measured by the vehicle velocity sensor. When the vehicle velocity of the self vehicle is low, the turning ratio is calculated using a distance between a front wheel and a rear wheel (that is, a wheel base), a steering angle, and a steering gear ratio. That is, when the vehicle velocity is low, the turning ratio is calculated by wheel base/(steering angle/ steering gear ratio). The wheel base is a vehicle specification stored in the memory (not illustrated), and the steering gear ratio is a ratio of a steering angle to an actual wheel angle and is a vehicle specification stored in the memory (not illustrated).

In Equation 4 above, $d_x$ is a longitudinal distance to the preceding vehicle.

The determination unit 33 compares the collision prediction time calculated by the calculation unit 32 with a preset reference time, and determines whether the collision prediction time is less than the reference time, for example, 1.2 second. When the collision prediction time is less than the reference time, the collision cannot be avoided by the braking force alone. Therefore, the collision with the opposite vehicle can be avoided by providing a braking force and a steering force to a wheel of a driver's steering intention direction and providing a braking release signal to a wheel opposite to the driver's steering intention direction.

In addition, the determination unit 33 can determine whether the collision can be avoided, considering the collision prediction area.

Furthermore, the determination unit 33 can determine whether both of a first condition and a second condition are satisfied, wherein the first condition is a condition that determines whether the collision prediction area is smaller than a preset reference area, and the second condition is a condition that determines whether the collision prediction time is less than a preset reference time. A condition satisfying both of the first condition and the second condition, and a condition satisfying only the second condition may be applied differently according to the degree of the braking force. Herein, the reference area may be determined as an area overlapped by about 40% when the entire area is 100%, but the number does not limit the present invention.

When it is determined by the determination unit 33 that both of the first condition and the second condition are satisfied or only the second condition is satisfied, the avoidance control unit 34 generates a braking control signal and a steering control signal for providing the wheel of the driver's steering intention direction with the braking force and the steering force based on the driver's steering intention, and generates a release control signal for releasing the braking force from the wheel opposite to the driver's steering intention direction. In this manner, the braking can be maintained without losing the steering force according to the driver's steering intention for collision avoidance. Therefore, upon forward collision, the collision damage can be reduced, and the driver and the vehicle can be protected.

The braking force generated when both of the first condition and the second condition are satisfied is twice the braking control signal generated when only the second condition is satisfied.

When it is determined by the determination unit 33 that both of the first condition and the second condition are not satisfied, the avoidance control unit 34 provides both wheels of the vehicle with the braking force.

A collision avoidance method of the collision avoidance apparatus for the vehicle as configured above will be described below with reference to FIG. 2.

Figure 2:
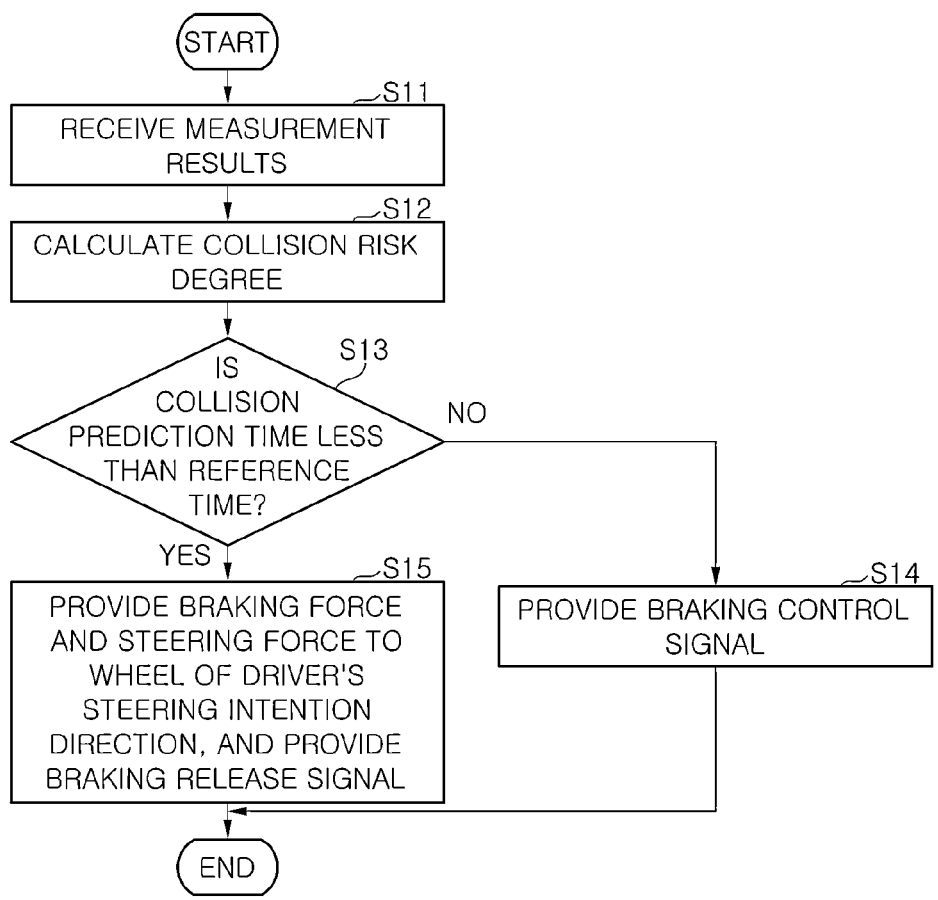
FIG. 2 is a flowchart illustrating a collision avoidance method for a vehicle according to an embodiment of the present invention.

FIG. 2 is an operation flowchart illustrating a collision avoidance method for a vehicle according to an embodiment of the present invention.

Referring to FIG. 2, the electronic control unit 30 receives measurement results from the measurement unit 10, the vehicle velocity sensor 12, the yaw rate sensor 15, and the steering angle sensor 20 (S11).

The electronic control unit 30 calculates a collision risk degree, including a collision prediction time and a collision prediction area overlapped with the opposite vehicle, based on vehicle velocity and trajectory of the vehicle which are predicted using the measurement results received from the vehicle velocity sensor 12, the yaw rate sensor 15, and the steering angle sensor 20, and position and velocity with respect to the opposite vehicle which are measured from the motion of the opposite vehicle by the measurement unit 10 (S12).

The electronic control unit 30 determines whether the calculated collision prediction time is less than a preset reference time (S13). Herein, although only the calculated collision prediction time is used as data for determining whether collision avoidance is possible, whether the collision avoidance is possible can be determined according to whether the collision prediction area included in the collision risk degree exceeds a preset reference area. The collision prediction time is calculated by Equation 1 or 2 above, and the collision prediction area is calculated by Equations 3 and 4 above.

When it is determined in step S13 that the calculated collision prediction time exceeds the preset reference time, the electronic control unit 30 provides the braking actuator with a braking control signal generated for applying a braking force for collision avoidance to both wheels of the vehicle (S14).

When it is determined in step s13 that the calculated collision prediction time is less than the preset reference time, the electronic control unit 30 recognizes that the collision cannot be avoided at that time, generates a braking control signal and a steering control signal for providing the wheel of the driver's steering intention direction with a braking force and a steering force, based on a steering angle received in step S11, provides the braking actuator and the steering actuator with the braking control signal and the steering control signal, generates a release control signal for releasing the braking force from a wheel opposite to the driver's steering intention direction, and provides the braking actuator with the release control signal (S15).

Herein, when the collision prediction time is less than the reference time, the braking force and the steering force are provided to the wheel of the driver's steering intention direction and the braking force is released from the wheel opposite to the driver's steering intention direction. However, the preset braking signal may be generated when the collision prediction area is smaller than the reference area and the collision prediction time exceeds the reference time, and the braking signal corresponding to twice the preset braking signal may be generated when the collision prediction area is larger than the reference area and the collision prediction time is less than the reference time.

Figure 3:
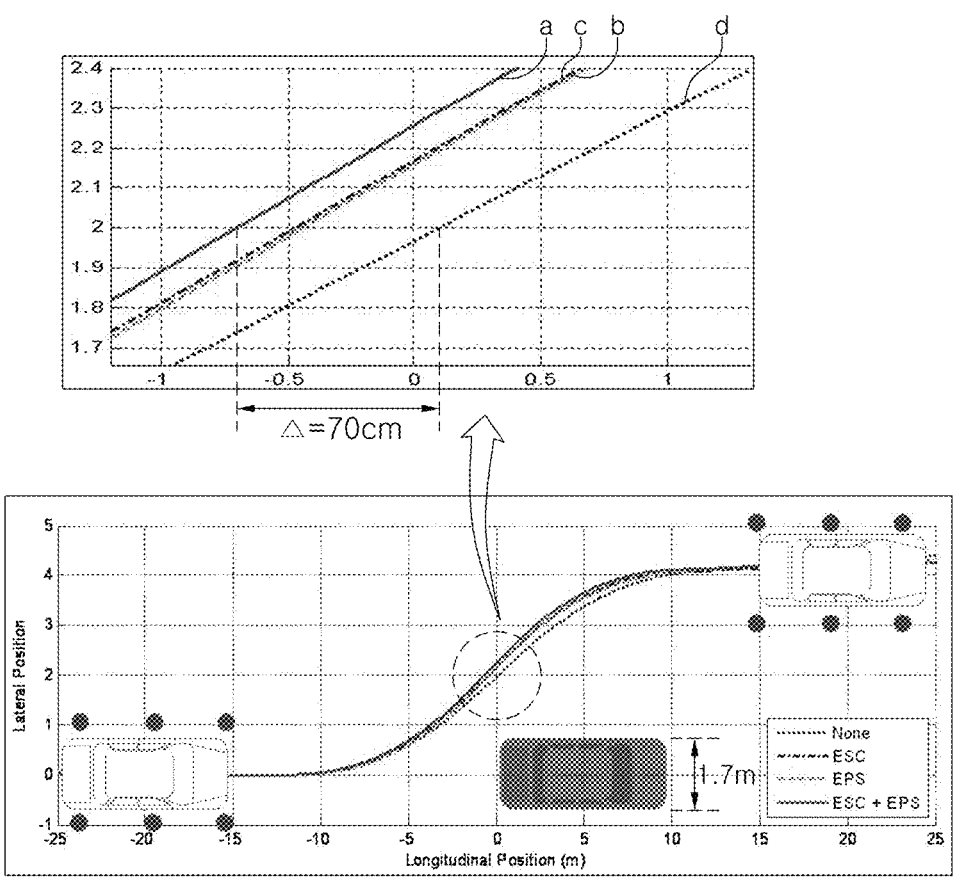
FIG. 3 is a graph illustrating a state in which a self vehicle quickly arrives at the same lateral position through the collision avoidance apparatus for the vehicle according to the embodiment of the present invention.

FIG. 3 is a graph illustrating a state in which the self vehicle quickly arrives at the same lateral position through the collision avoidance apparatus for the vehicle according to the embodiment of the present invention.

The graph of FIG. 3 illustrates experimental results when a driving velocity was 60 km/h and the number of experiments was none and conducted 15 times in ESC, EPS, and ESC+EPS.

Referring to FIG. 3, (a) of FIG. 3 is a graph illustrating a trajectory of a vehicle when the braking force and the steering force were provided to the wheel of the driver's steering intention direction and the braking force was released from the wheel opposite to the driver's steering intention direction, (b) of FIG. 3B is a graph illustrating a trajectory of a vehicle when the braking force was provided for collision avoidance, (c) of FIG. 3C is a graph illustrating a trajectory of a vehicle when the steering force was provided for collision avoidance, and (d) of FIG. 3D is a graph illustrating a trajectory of a vehicle when the braking force and the steering force were not provided.

As can be seen from the enlarged view of FIG. 3, the vehicle quickly arrives at the same lateral position by about 70 cm. Therefore, when the driver cannot avoid collision by braking, the braking force and the steering force are provided to the wheel of the driver's steering intention direction, and the braking force is released from the wheel opposite to the driver's steering intention direction. In this manner, the collision with the opposite vehicle can be avoided by making the vehicle move more quickly than the case where either the braking force or the steering force is provided.

According to the present invention, the collision avoidance apparatus and method for the vehicle are capable of maintaining the braking force and assisting the steering force by providing the braking control signal and the steering control signal to the wheel of the driver's steering intention direction during braking for collision avoidance, thereby achieving lateral avoidance.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: measurement unit | 20: detection unit |
| 30: electronic control unit | 31: reception unit |
| 32: calculation unit | 33: determination unit |
| 34: avoidance control unit | 40: actuator |

What is claimed is:

1. A collision avoidance apparatus for a vehicle, comprising:
a measurement unit configured to measure a motion of an opposite vehicle; and
an electronic control unit configured to determine whether there is a risk of collision with the opposite vehicle, based on a measurement result from the measurement unit, and, when it is determined that there is the risk of collision, generate a braking control signal and a steering control signal to provide a braking force and a steering force at at least one wheel positioned in a driver's steering intention direction, and generate a braking release signal for releasing a braking force at another wheel positioned opposite to the driver's steering intention direction.

2. The collision avoidance apparatus according to claim 1, further comprising a steering angle sensor configured to detect the driver's steering intention direction.

3. The collision avoidance apparatus according to claim 2, wherein the electronic control unit includes:
a calculation unit configured to calculate a collision risk degree, including a collision prediction time and a collision prediction area overlapped with the opposite vehicle, based on vehicle velocity and trajectory of the corresponding vehicle which are predicted through a vehicle velocity sensor, a yaw rate sensor, and the steering angle sensor installed in the vehicle, and position and velocity of the opposite vehicle which are obtaining by measuring a motion of the opposite vehicle through the measurement unit;
a determination unit configured to determine whether the collision prediction time calculated by the calculation unit is less than a preset reference time; and
an avoidance control unit configured to, when it is determined by the determination unit that the collision prediction time is less than the preset reference time, generate a braking signal for maintaining a braking force at the at least one wheel positioned in the driver's steering intention direction, based on a detection signal detected by the steering angle sensor, and generate the steering control signal for providing the steering force according to the driver's steering intention.

4. The collision avoidance apparatus according to claim 3, wherein
the determination unit further determines whether the collision prediction area calculated by the calculation unit is larger than a reference area, and
the avoidance control unit generates a preset braking signal when it is determined by the determination unit that the collision prediction area is smaller than the reference area and the calculated collision prediction time exceeds the reference time, and generates a braking signal corresponding to twice the preset braking signal when the collision prediction area is larger than the reference area and the calculated collision prediction time is less than the reference time.

5. The collision avoidance apparatus of claim 1, wherein the electronic control unit is configured to provide the braking force at both the at least one wheel positioned in the driver's steering intention direction and the another wheel positioned opposite to the driver's steering intention direction when a collision prediction area is not smaller than a preset reference area and a collision prediction time is not less than a preset reference time.

6. The collision avoidance apparatus of claim 5, wherein the electronic control unit is configured to provide the braking force and the steering force at the at least one wheel positioned in the driver's steering intention direction and release the braking force at the another wheel positioned opposite to the driver's steering intention direction when the collision prediction area is smaller than the preset reference area and/or when the collision prediction time is less than the preset reference time.

7. A collision avoidance method of a collision avoidance apparatus for a vehicle, the collision avoidance method comprising:
receiving measurement results from a sensor and a measurement unit installed in the vehicle;
determining whether there is a risk of collision with an opposite vehicle, based on the received measurement results; and
when it is determined that there is the risk of collision, generating a braking control signal and a steering control signal to provide a braking force and a steering force at least one wheel positioned in a driver's steering intention direction, and providing a braking release signal for releasing a braking force at another wheel positioned opposite to the driver's steering intention direction.

8. The collision avoidance method according to claim 7, further comprising:
receiving a detection signal corresponding to the driver's steering intention direction detected by a steering angle sensor installed in the vehicle.

9. The collision avoidance method according to claim 8, further comprising:
after the receiving step, calculating a collision risk degree, including a collision prediction time and a collision prediction area overlapped with the opposite vehicle, based on vehicle velocity and trajectory of the vehicle which are predicted through a vehicle velocity sensor, a yaw rate sensor, and the steering angle sensor installed in the vehicle, and position and velocity of the opposite vehicle which are obtained by measuring a motion of the opposite vehicle through the measurement unit,
wherein the determining step determines whether the collision prediction time calculated through the calculating step is less than a preset reference time, and
when it is determined that the collision prediction time is less than a preset reference time, the providing step generates a braking signal for maintaining a braking force at the at least one wheel positioned in the driver's steering intention direction, based on the detection signal detected by the steering angle sensor, and generates the steering control signal for providing the steering force according to the driver's steering intention.

10. The collision avoidance method according to claim 9, wherein
the determining step further determines whether the calculated collision prediction area is larger than a reference area, and
the providing step generates a preset braking signal when it is determined that the collision prediction area is smaller than the reference area and the calculated collision prediction time exceeds the reference time, and generates a braking signal corresponding to twice the preset braking signal when the collision prediction area is larger than the reference area and the calculated collision prediction time is less than the reference time.

11. The collision avoidance method of claim 7, further comprising providing the braking force at both the at least one wheel positioned in the driver's steering intention direction and the another wheel positioned opposite to the driver's steering intention direction when a collision prediction area is not smaller than a preset reference area and a collision prediction time is not less than a preset reference time.

12. The collision avoidance method of claim 11, wherein the generating the braking control signal and the steering control signal comprises providing the braking force and the steering force at the at least one wheel positioned in the driver's steering intention direction and releasing the braking force at the another wheel positioned opposite to the driver's steering intention direction when the collision prediction area is smaller than the preset reference area and/or when the collision prediction time is less than the preset reference time.

* * * * *